Feb. 16, 1943.  R. D. MICHAEL  2,311,243
BOUNDARY LINE MARKER FOR GRASS BADMINTON COURTS
Filed Dec. 6, 1941

Inventor.
Rudolph Dixon Michael

Patented Feb. 16, 1943

2,311,243

UNITED STATES PATENT OFFICE 2,311,243

BOUNDARY LINE MARKER FOR GRASS BADMINTON COURTS

Rudolph Dixon Michael, Blacksburg, Va.

Application December 6, 1941, Serial No. 421,926

3 Claims. (Cl. 273—31)

The invention relates to the marking of grass badminton courts with painted wooden strips secured in position by means of springs under tension, and has for its object to provide a simple but satisfactory semi-permanent marking, that will not be damaged by freezing and thawing.

Figure 1:
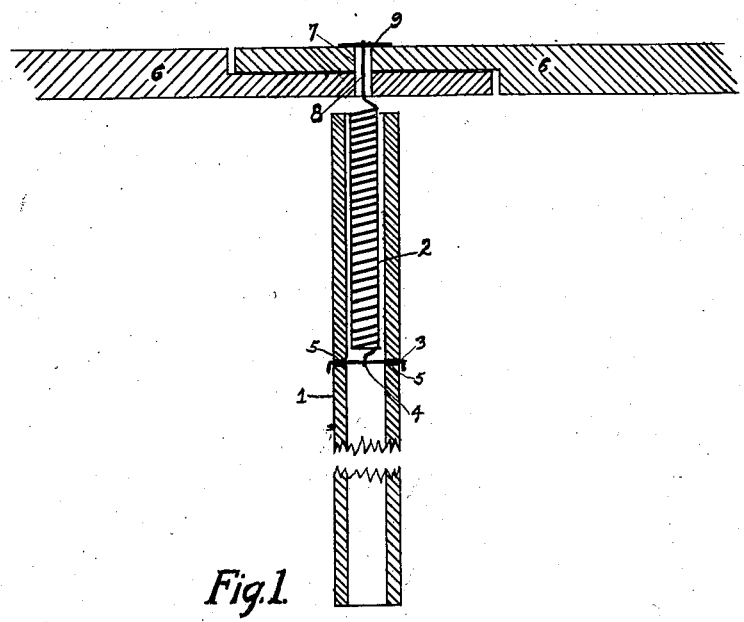
Figure 2:
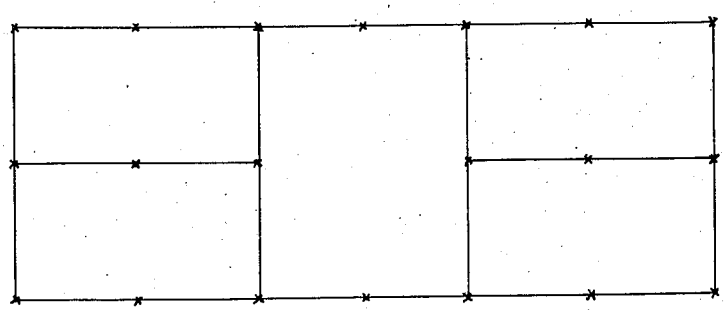

The method employed is illustrated in the accompanying drawing, in which Figure 1 is a longitudinal section through a marker and its anchorage at a lap-joint, and Figure 2 indicates recommended locations of anchorages (at $x$) for a singles badminton court. A pipe 1, of sufficient length to reach several inches below frost line, and fitted with a spring 2, which is secured at its lower end by a pin 3, through a loop 4 on the spring and holes 5, 5 in the pipe, is driven into the ground at intervals along the boundary lines (recommended locations are shown in Figure 2).

Wooden strips 6, 6, of suitable width and thickness and painted white, are used as markers. Over each anchorage a hole 7 in the strips 6, 6 is located, through which loop 8, on the upper end of the spring 2, is drawn and held in place by a pin 9.

I claim:

1. Means for marking the lines of lawn courts comprising, a plurality of marker strips having recessed ends, the ends of adjacent strips comating to form lap-joints, and yieldable means anchoring the joined ends of each two adjacent strips to the ground, whereby the strips are free to rise and fall while maintaining the top surfaces of the ends of adjacent strips flush with each other and with the ground.

2. Means for marking the lines of lawn courts comprising, a plurality of marker strips flush with the surface of the lawn and having recessed ends, and yieldable means anchoring the joined ends of each two adjacent strips to the ground, the said strips being free from anchorage between their ends, whereby the strips are free to rise and fall while maintaining the top surfaces of the ends of adjacent strips flush with one another and with the ground.

3. Means for marking the lines of lawn courts comprising, a plurality of marker strips flush with the surface of the lawn, the meeting ends of the strips being lap-jointed, a pipe embedded in the ground beneath each of said lap-joints, and yieldable means connecting the lap-jointed ends of the strips to said pipe, whereby the strips may floatingly rise and fall with the freeze and thaw of the ground and each marker strip independently accommodates its position to the ground.

RUDOLPH DIXON MICHAEL.